United States Patent [19]

Tinkler

[11] Patent Number: 5,140,416
[45] Date of Patent: Aug. 18, 1992

[54] SYSTEM AND METHOD FOR FUSING VIDEO IMAGERY FROM MULTIPLE SOURCES IN REAL TIME

[75] Inventor: Richard D. Tinkler, Garland, Tex.

[73] Assignee: Texas Instruments Incorporated, Dallas, Tex.

[21] Appl. No.: 583,980

[22] Filed: Sep. 18, 1990

[51] Int. Cl.$^5$ .............................................. H04N 5/272
[52] U.S. Cl. ..................... 358/88; 358/125; 358/95; 382/9
[58] Field of Search ............. 358/182, 22 PR, 22 CK, 358/141, 142, 108, 125, 95, 183, 88; 382/61, 9

[56] References Cited

U.S. PATENT DOCUMENTS

| | | | |
|---|---|---|---|
| 4,183,013 | 1/1980 | Agrawala et al. | 382/9 |
| 4,538,182 | 8/1985 | Saito et al. | 382/61 |
| 4,647,965 | 3/1987 | Imsand | 358/88 |
| 4,672,438 | 6/1987 | Plante et al. | 358/125 |
| 4,723,159 | 2/1988 | Imsand | 358/88 |
| 4,819,064 | 4/1984 | Diner | 358/88 |
| 4,862,257 | 8/1989 | Ulich | 358/95 |
| 4,905,081 | 2/1990 | Morton | 358/88 |
| 4,967,276 | 10/1990 | Murakami et al. | 358/183 |
| 5,005,083 | 4/1991 | Grage et al. | 358/125 |
| 5,065,442 | 11/1991 | Kagai | 382/9 |

FOREIGN PATENT DOCUMENTS 0235902 9/1987 European Pat. Off. .

Primary Examiner—James J. Groody
Assistant Examiner—Jeffrey S. Murrell
Attorney, Agent, or Firm—Rene' E. Grossman; Richard L. Donaldson

[57] ABSTRACT

A system and method for fusing or merging video imagery from multiple sources such that the resultant image has improved information content over any one of the individual video images. The sensors generating the video imagery are typically responsive to different types of spectral content in the scene being scanned, such as visible and infra-red or short and long wavelength infra-red, and the like. This permits real-time, high pixel rate operation with hardware implementation of moderate cost and complexity. Image enhancement by frequency content specification is another advantage of this approach. The flexiblity permits application to many different video formats and line rates.

30 Claims, 6 Drawing Sheets

SYSTEM AND METHOD FOR FUSING VIDEO IMAGERY FROM MULTIPLE SOURCES IN REAL TIME

BACKGROUND OF THE INVENTION

1. Field of the Invention

This invention relates to a system and method for imaging a scene with plural sensors sensitive to different scene characteristics, determining the best features received from each sensor and then fusing or merging imagery of the best features from the multiple sensors to provide an image having improved information content.

2. BRIEF DESCRIPTION OF THE PRIOR ART

Image sensors employed in present day military and scientific environments attempt to extract as much information about a scene under observation as possible. In order to perform this function, it is necessary to interrogate the scene being observed with as many different types of sensors as is feasible. Visible, infra-red and image intensified sensors represent three of the most common passive imaging sensors utilized in the military environment. Each sensor detects different information about the imaged scene.

It is possible to present the operator with multiple simultaneous displays, one from each of the sensors, or allow the operator to switch between or among the sensor outputs. However, displaying all of the information content from each of the sensors on a single composite display represents a far superior approach from an operator workload standpoint.

Known existing approaches to the above noted problems either do not lend themselves to real-time implementations or result in critical information loss or distortion. Known approaches are:

1. Adding or averaging the multiple images. This approach has the potential for critical information loss. As an example, if two images contain the same object but of equal magnitude and opposite polarity, they will cancel one another out in the resultant image.

2. Level based keying wherein the level of one image is used as the criterion for switching to the other image. This approach results in ragged edge artifacts when the other image is switched in. It also does not insure that the switched image will have any better information content than the prior image.

3. Transform based approaches which technical literature describes as several transform based techniques such as the Hotelling Transform approach. These approaches have been primarily developed for merging satellite photographs from different spectral sensors. These techniques do not lend themselves to real-time implementations.

4. ROLP (Ratio of Low-Pass) pyramid which is based upon successive lowpassing and decimation. Decimation is a common digital signal processing technique for downsampling or sample rate reduction. For example, if a signal is decimated by 4, every fourth sample is retained and the rest are discarded. It again does not lend itself to reasonable real-time hardware implementations.

SUMMARY OF THE INVENTION

Briefly, the system and method in accordance with the present invention fuses or merges video imagery from multiple sources such that the resultant image has improved information content over any one of the individual video images. The sensors generating the video imagery are typically responsive to different spectral content in the scene being scanned, such as visible and infra-red or short and long wavelength infra-red, and the like. The invention can also be applied to non-passive sensors, such as imaging RADAR or Laser RADAR (LADAR). This permits real-time, high pixel rate operation with hardware implementation of moderate cost and complexity. Image enhancement by frequency content specification is another advantage of this approach. The flexibility permits application to many different video formats and line rates.

The system generates fused or merged imagery from two or more video sources in real-time. The disclosure herein will be presented with reference to two different video sources, it being understood that more than two different video sources can be used. The two sensor fields of view are aligned and are either identical or subsets of one another. The fusion hardware accepts digitized pixel aligned data from each sensor and generates a single output which is the fused resultant image therefrom.

Briefly, an image fusion circuit in accordance with the present invention provides a fused video output and receives two different digital video inputs from the sensor field. The sensor fields are aligned and are either identical or subsets of one another.

The system accepts digitized pixel aligned data from each sensor at the feature/background separation circuit which separates the video signals from input into features and backgrounds. The term "pixel alignment" means that a pixel being input on a first digital video input represents the same portion of a scene being scanned as the pixel being simultaneously input on the second digital video input. The features are the information or the high frequency or the detail in the scene being scanned, such as, for example, the edges of buildings. The background is the shading and more subtle levels to the scene. The background is selected or generated on a global basis.

The feature/background selection circuit generates the features from each of the first and second inputs on separate lines to a local area feature selection circuit. In addition, the feature/background selection circuit generates the background from each of the first and second inputs on separate lines to a global background selection circuit. The feature selection circuit selects the appropriate, principal or best feature at each pixel and sends a single composite feature video stream signal indicative thereof to the feature/background merge circuit. Also, the background selection circuit selects the appropriate background at each pixel and sends a single composite background video stream signal indicative thereof to the feature/background merge circuit. These video streams are then merged into a final composite fused video output by the feature/background merge circuit. The video output is displayed on a cathode ray tube or the like to provide the enhanced image thereon.

DESCRIPTION OF THE PREFERRED EMBODIMENT

Figure 1:
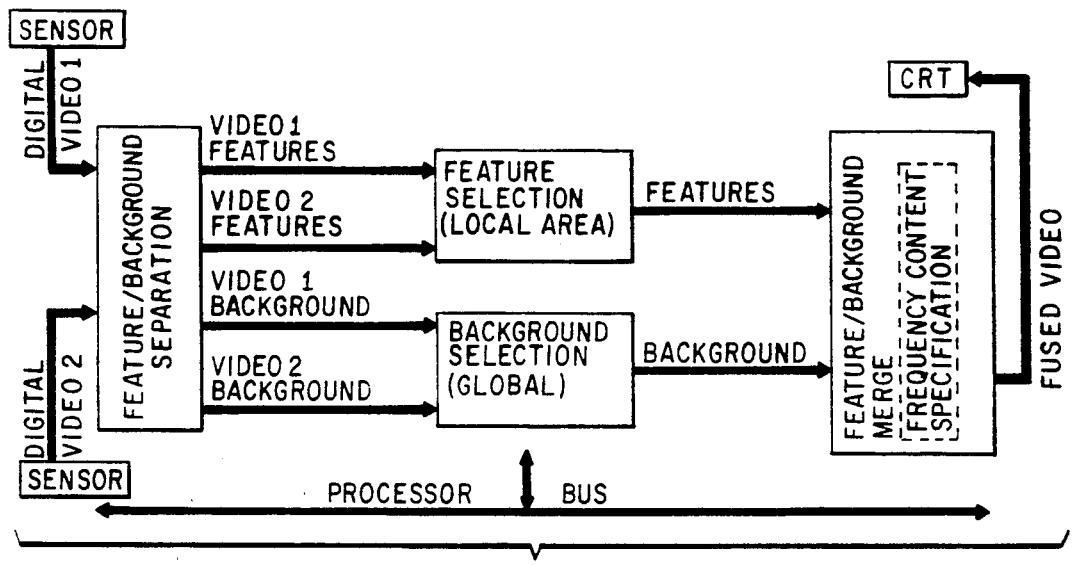
FIG. 1 is a block diagram of an image fusion circuit in accordance with the present invention.

Referring first to FIG. 1, there is shown a block diagram of an image fusion circuit in accordance with the present invention. The system provides a fused video output and receives two different digital video inputs from the sensor field. The sensor fields are aligned and are either identical or subsets of one another.

The system accepts digitized pixel aligned data from each sensor at the feature/background separation circuit which separates the video signals from input into features and backgrounds. The background is selected or generated on a global basis. The feature/background separation circuit generates the features from each of the first and second inputs on separate lines to a local area feature selection circuit and also generates the background from each of the first and second digital video inputs on separate lines to a global background selection circuit. The feature selection circuit selects the appropriate, principal or best feature at each pixel, on a pixel by pixel basis, such as the feature with the greatest magnitude, and sends a single composite feature video stream signal indicative thereof to the feature/background merge circuit. The background selection circuit selects the background on a global basis rather than on a pixel by pixel basis. The selected background may be either of the first video background or the second video background or an average of the two. Under most circumstances, the average background is selected. In certain applications where one of the background signals contains little useful information, the other background signal may be selected. The selection process can be automated by using the background statistics as criteria for selecting the desired output. The statistics utilized would be the standard deviation of the grey level histogram or the peak-to-peak values of the background signals. Both the peak-to-peak statistic and the standard deviation of the grey level histogram are indicative of the variations seen in the background. The background selection circuitry sends a single composite video signal indicative thereof to the feature background merge circuit. These composite feature video stream signals and composite background video stream signals are the merged into a final composite fused video output by the feature/background merge circuit.

Figure 10:
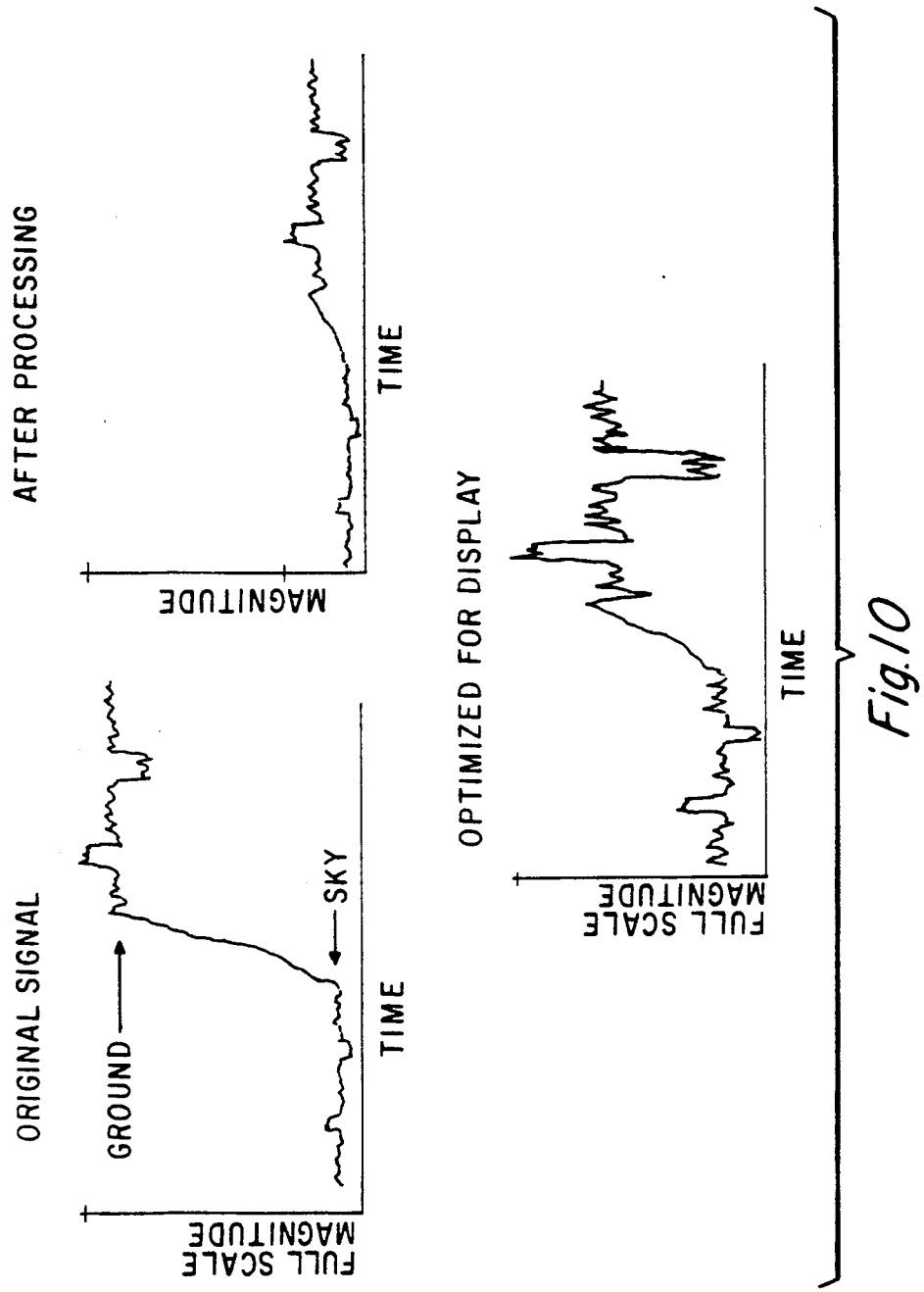
FIG. 10 is a diagram of frequency content specification.

The ratio of features to background can be controlled by frequency content specification. Frequency content specification is a means whereby the ratio of background to features (or low spatial frequencies to high spatial frequencies) in the resultant image is continuously monitored and adjusted to maintain optimum image quality. Frequently, imaged scenes contain much higher dynamic range than can be displayed on a CRT or other type of video display device. Much of the dynamic range is due to wide variations in the low frequency components of the scene which typically do not contain information of interest. In a FLIR image, for example, the effect has come to be known as the "sky-wedge" effect due to the tremendous thermal difference between sky and ground relative to the small thermal variations in the detail of interest. FIG. 10 illustrates this effect and how frequency content specification processing can be utilized to reduce the contribution of the low frequency components and increase the contribution of the feature or high frequency components in a signal.

Figure 2:
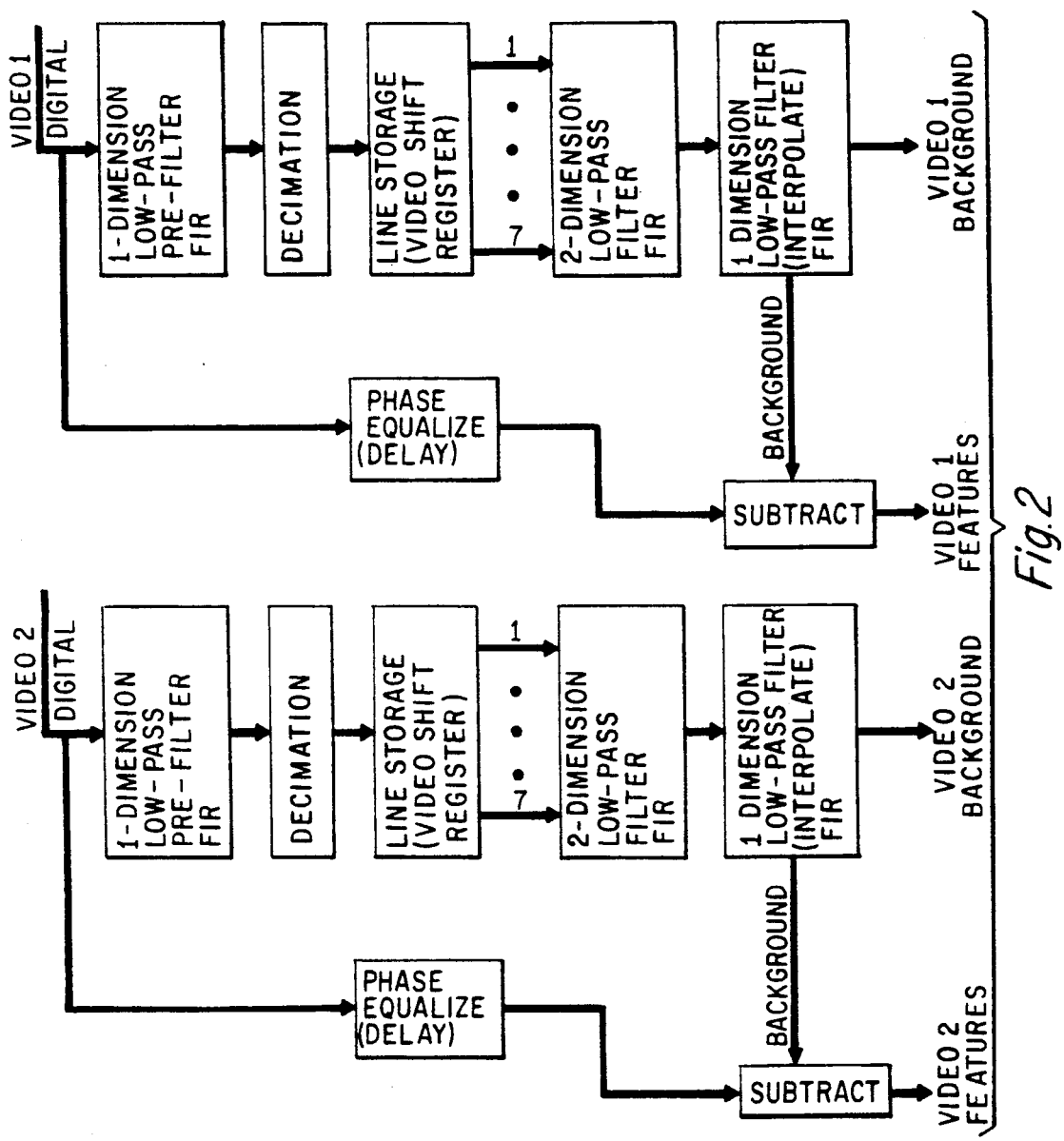
FIG. 2 is a block diagram of the feature/background separation circuit of FIG. 1 in accordance with the present invention.

Referring now to FIG. 2, there is shown a block diagram of the feature/background separation circuit of FIG. 1. The feature/background separation circuit is actually two identical circuits, one circuit to accept a first of the digital video inputs and provide therefrom a first video background and a first video features signal and the other circuit to accept a second of the digital video inputs and provide therefrom a second video background and a second video features signal. The separation criteria are based upon the two dimensional spatial frequency spectra. Since the two circuits are identical, only one will be described, it being understood that each of the circuits operates identically.

The background is determined by storing the input digital video signal in a line storage or video shift register and then convolving the video signal with a two dimensional low-pass filter or finite impulse response (FIR) filter. The two dimensional convolution implements the equation:

$$Y(n,m) = \sum_{l=0}^{L-1} \sum_{k=0}^{K-1} h_{l,k}\, x(n-1, m-k)$$

where:
y(n,m) is the filtered output pixel
x(n−1,m−k) are the neighborhood pixels
hi,k are the FIR filter coefficients.

Figure 6:
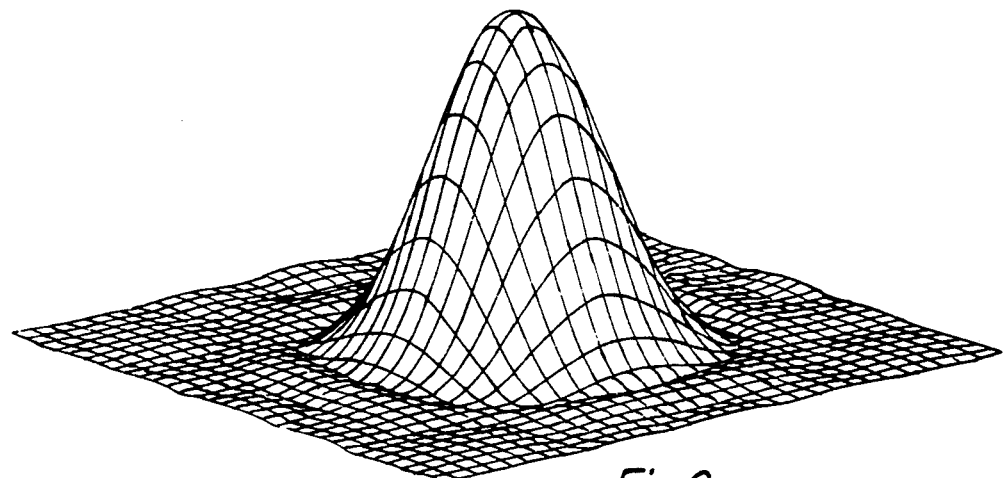
FIG. 6 is a two dimensional low-pass frequency response curve for the FIR of FIG. 2.
Figure 7:
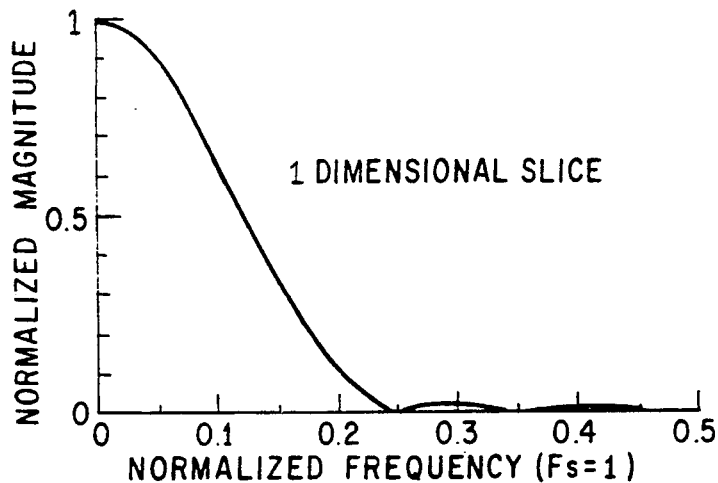
FIG. 7 is a graph of FIR background frequency response.

Two dimensional FIR filters which implement a 7×7 filtering function provide sufficient frequency resolution for adequate image fusion. These filters can be implemented with off-the-shelf devices such as the LSI Logic L64240 or the INMOS IMSA110. The L64240 requires an external video shift register while the IMSA110 requires multiple devices to be cascaded. These off-the-shelf devices can typically operate at about 20 MHz maximum data rates. It would also be possible to implement the filter structure out of digital signal processing (DSP) building blocks or in a custom application specific integrated circuit (ASIC). A typical 2-dimensional low-pass frequency response curve is shown in FIG. 6. The output of the 2-dimensional filter provides the first video background signal.

The background information is obtained by the low pass filtering operation. The features are obtained by subtracting the low frequency or video background from the original delayed or phase equalized input digital video signal. The delay in the phase equalize circuit is sufficient to compensate for the accumulate delay in each of the 1-dimension low pass pre-filter, if used, the decimation circuit, if used, the line storage or video shift register, the 2-dimension low-pass filter (FIR) and the 1-dimension low pass filter (interpolate) (FIR), if used.

If video pixel rates faster than 20 MHz are required, the input digital video signal is pre-filtered in the 1-dimension low pass pre-filter of standard type, the characteristics of which are programmed by means of appropriate coefficients in well known manner, such as, for example, using an LSI Logic L64143. Coefficients are calculated to perform a low-pass filtering function to attenuate frequency components higher than one half the equivalent sampling frequency of the decimation circuitry, if used. Pre-filtering is required only if decimation is utilized. The prefiltering prevents spectral aliasing from occurring if the signal is decimated. The output of this filter is decimated in the decimation circuit which is a standard circuit for passing therethrough every Nth sample applied thereto, the value of N being predetermined. This could be, for example, a shift register which outputs every fourth sample. The output of the decimation circuit is then passed to the line storage circuit which is a standard shift register such as, for example, an LSI Logic L64211. Also, the output of the 2-dimension low-pass filter is passed to a 1-dimension low-pass filter from which the video background signal is then provided which can be the same as the previously discussed 1-dimension low-pass filter but with different coefficients. This filter performs linear interpolation to calculate the sample points between the output samples of the 2-dimensional low-pass filter, which are decimated, such that the sample rate now matches the delayed phase equalized video. That is, if decimation was performed to reduce the data rate of the video by a factor of four, then linear interpolation would be performed to estimate the value of the three sample points between each of the decimated samples. In linear interpolation, the last two samples are averaged and a point midway therebetween is provided in this manner. The filtered background results are interpolated. Pre-filtering is required to prevent aliasing (aliasing is a common effect seen in sampled data systems which occurs when the sampled signal contains frequency components greater than one half the sample frequency. The result of aliasing is that the components of the signal greater than half the sample frequency appear as lower frequency signals in the sampled signal and the original signal cannot be adequately reproduced.) that would result when the signal is decimated. One dimensional pre-filtering, decimation and interpolation provides sufficient data rate reduction for the two dimensional FIR filter. For example, if decimation by four is applied, pixel rates as high as 80 MHz can be processed by the L64240 device.

Figure 8:
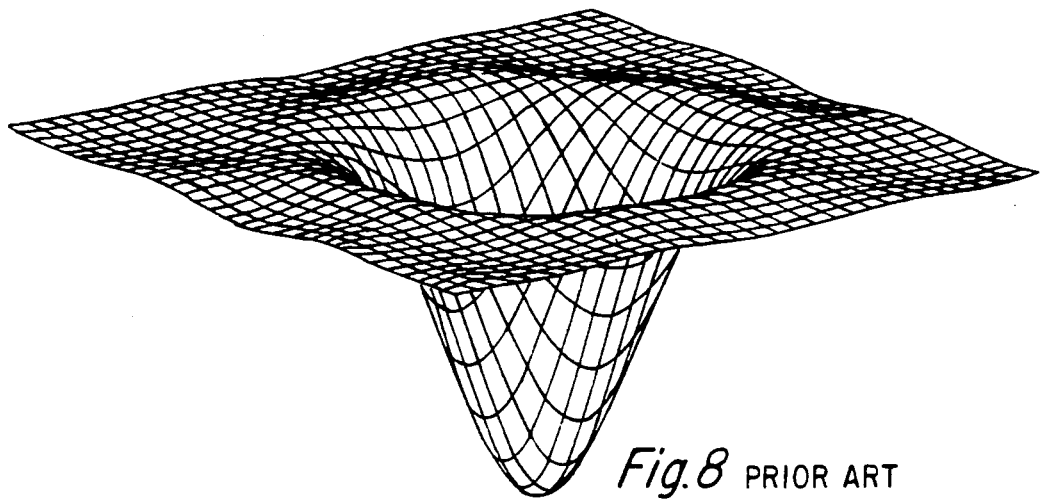
FIG. 8 is a two dimensional high-pass frequency response curve.
Figure 9:
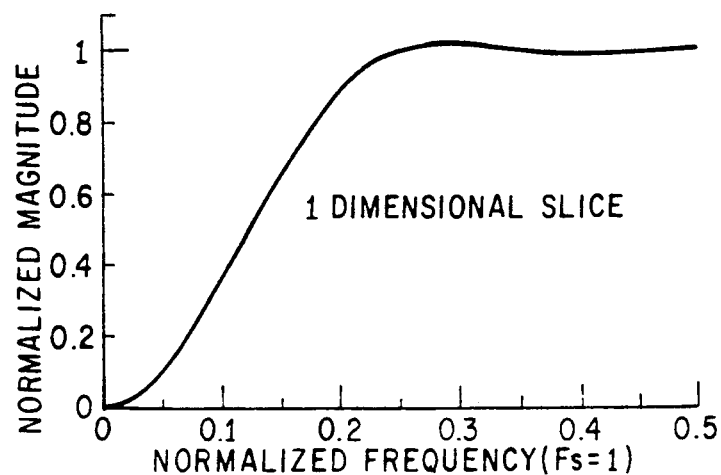
FIG. 9 is a graph of FIR feature frequency response.

The feature component of the input digital video signal is derived by subtracting the video background from the delayed input digital video signal in the subtract circuit by standard twos complement addition. The delay provided by the phase equalize or delay circuit, which is a standard digital delay line, compensates for the two dimensional phase shift and any other delay that occurs as a result of the filtering process. The resultant features represent the higher frequency components of the video which are not contained in the background. FIG. 8 illustrates the two dimensional frequency response. A one dimensional "slice" of the resultant feature spatial frequency content is shown in FIG. 9.

Figure 3:
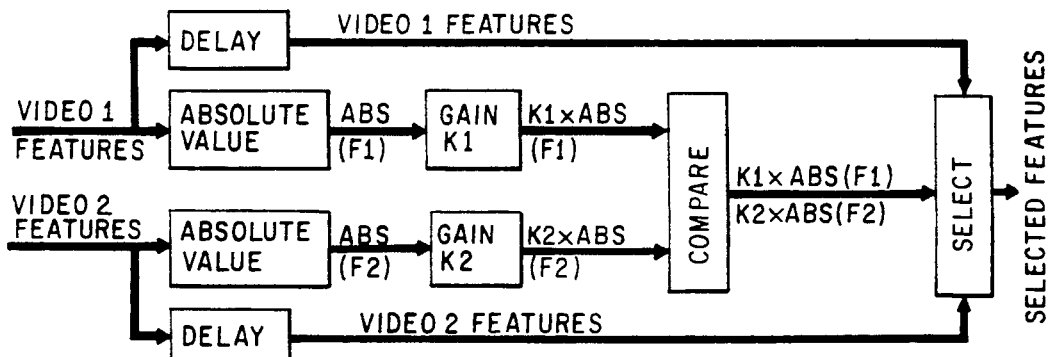
FIG. 3 is a block diagram of the feature selection circuit of FIG. 1 in accordance with the present invention.

The feature with the greatest magnitude, whether positive or negative, is selected at each pixel location as shown in the feature selection circuit in FIG. 3 where two identical circuits receive and process the feature signals. This is accomplished by taking the absolute value in a standard absolute value circuit of each feature pixel from FIG. 2 and providing a weighted gain thereof for one of the input signals relative to the other input signal, if desired, in a gain circuit for each of the first and second video feature digital signals. The outputs of the gain circuits are compared in a compare circuit of standard type which provides an output of the input signal thereto of greater magnitude. Different weighting would be employed if, for example, it were known that one source was noisier than the other. The outputs of the gain circuits are compared in a compare circuit of standard type which provides an output of the input signal thereto of greater magnitude through a select circuit. Also, the inputs to the absolute value circuits are each fed to the select circuit via a separate delay circuit. The delay circuits are employed to synchronize the features with the comparison results. It follows that, based upon the output of the compare circuit, the select circuit merely permits either the delayed first video features or the delayed second video features to be output therefrom a the selected features. This output is a signed composite feature image with both positive and negative features.

Figure 4:
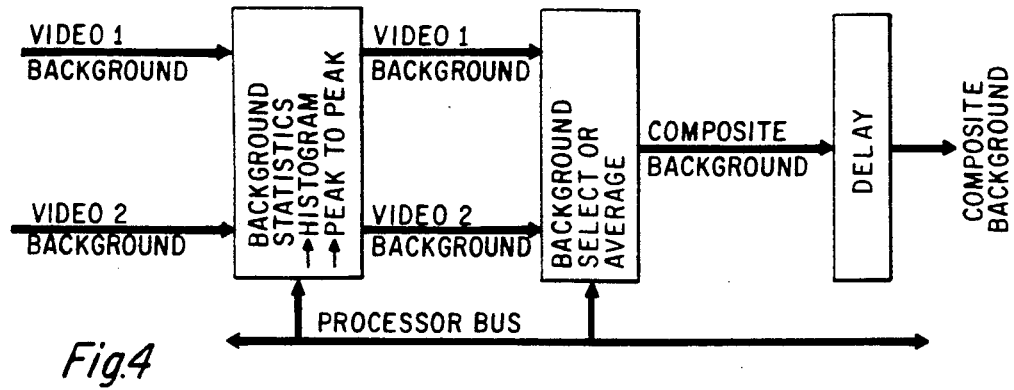
FIG. 4 is a block diagram of the background selection circuit of FIGURE 1 in accordance with the present invention.

The background selection circuit is shown in FIG. 4. The background selection occurs on a global basis rather than a pixel-by-pixel basis. This is, the parameters controlling the selection process are only updated on a video frame basis. Depending upon the application and sensors employed, the output background can be either of the video 1 background, video 2 background from FIG. 2 or an average of the two. Continuously selecting the average of the two backgrounds is adequate for many applications. However, if one sensor contains little information or is "washed out", the other background can be selected. The selection process can also be programmed to occur automatically under processor control. In the case of processor controlled selection, the peak-to-peak and/or grey level histograms of each background are sampled during the video frame and are used as criteria to select the background or combinations of backgrounds to be output on the next video frame. As an example, if the peak-to-peak measurements of each of the backgrounds is used as the selection criterion:

1. If background peak-to-peak statistics from both of the background signals exceed user defined criteria, being indicative of adequate information content in both background signals, then an average of the video 1 and video 2 background signals is selected to be output as the composite background in the next video frame.

2. If the peak-to-peak measurement from only one of the background signals exceeds the defined criteria, then this background alone is selected as the composite background signal to be output in the next video frame.

3. If the peak-to-peak measurement from both of the background signals falls below the defined criteria, then either an average of the two or the greater of the two backgrounds is selected to be output in the next video frame depending upon the sensors employed and user preference.

Similarly, if the grey level histogram is used in addition to or in place of the peak-to-peak statistic, then the standard deviation of this histogram distribution, being indicative of the information content in the background signals, is utilized as the selection criterion. Again, the selection process is governed by the following:

1. If background histogram standard deviation statistics from both of the background signals exceed user defined criteria, being indicative of adequate information content in both background signals, then an average of the video 1 and video 2 background signals is selected to be output as the composite background in the next video frame.
2. If the standard deviation statistic measurement from only one of the background signals exceeds the defined criterion, then this background alone is selected as the composite background signal to be output in the next video frame.
3. If the standard deviation statistic from both of the background signals falls below the defined criteria, then either an average of the two or the greater of the two backgrounds is selected to be output in the next video frame depending upon the sensors employed and user preference.

Peak-to-peak circuits are standard and are defined in many digital logic textbooks. These circuits store both the highest and lowest values occurring in a data stream over a given period of time or until reset. Grey level histogram circuits are also standard in the field of image processing and are described in many image processing textbooks. They are also available as single parts such as the LSI Logic L64250. These histogram circuits collect the histogram data from which the controlling program calculates the standard deviation statistic.

The processor bus can be any generic processor which controls the selection process as well as retrieving statistical information used as selection criteria by loading each of the circuits to which it is coupled with the appropriate parameters, such as the coefficients, etc. reading the peak detectors and histograms and making decisions as to which global background should be selected. The input to the background select or average circuit form the processor bus determines whether that circuit will select a particular one of the input signals thereto or average the input signals thereto. The background output from the background select or average circuit is delayed in the delay circuit to provide proper alignment with the feature output signal of FIG. 3.

Figure 5:
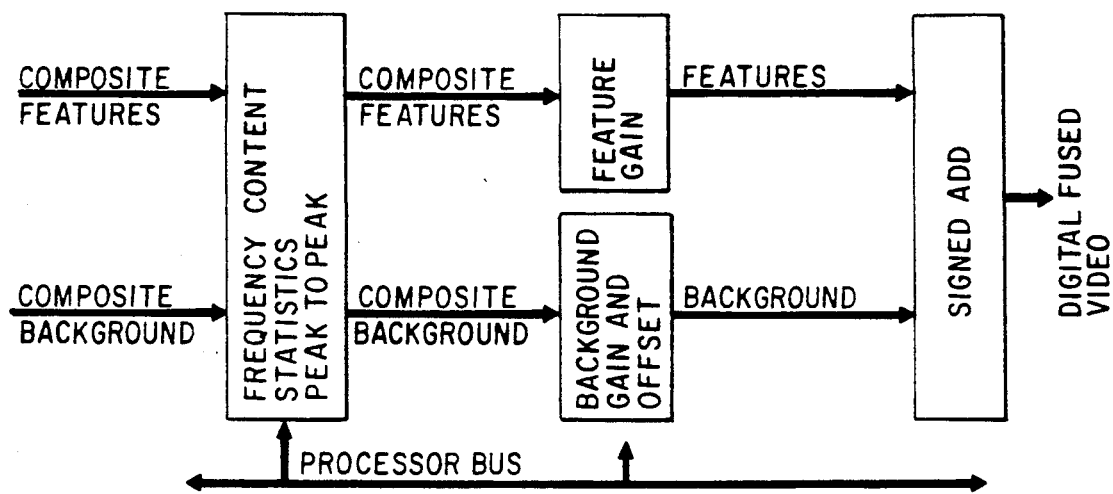
FIG. 5 is a block diagram of the feature/background merge circuit of FIG. 1 in accordance with the present invention.

The composite features and composite background signals from FIGS. 3 and 4 are combined as shown in FIG. 5 in the feature/background merge circuit. The peak to peak magnitude of both the features and background is continuously sampled on a frame by frame basis in a frequency content statistics circuit which measures the peak to peak value of the features and the peak to peak value of the background. The frequency content statistics circuitry passes the composite features and composite background signals unchanged. The peak-to-peak statistics of each signal are measured during a video frame and analyzed by the controlling processor to calculate the gains to be programmed into the feature gain and background gain circuits for the next video frame. An offset value is added to the result of the gain multiplication of the composite background in the background gain and offset circuit. This offset value is selected to center the resultant background signal within the available dynamic range. The peak-to-peak detectors are the same as described hereinabove. This circuitry stores both the highest and lowest values seen on the data stream during a video frame. In the case of the features which are both positive and negative, the lowest value is taken as the most negative. Both the feature and background gain circuits are constructed from standard digital multipliers which are off-the-shelf items.

The output of the frequency content statistics circuit is applied along one line as composite features signals to a feature gain circuit and along a second line as composite background signals to a background gain circuit. The processor continually adjusts the gain of each of the feature gain and background gain circuits to maintain the optimum ratio of high and low frequency components. If no enhancements are desired, both gains are set to 1. The scaled features and background signals are then added together in a signed add circuit to form the final fused digital video image signal for transmission to an external device, such as, for example, a cathode ray tube. The features signal to the signed add circuit can be positive or negative whereas the background signal thereto is always positive. Therefore, if the features are negative, they subtract from the background and, if positive, they add. Therefore, the signed adder is a standard adder capable of accepting negative numbers.

Figure 11:
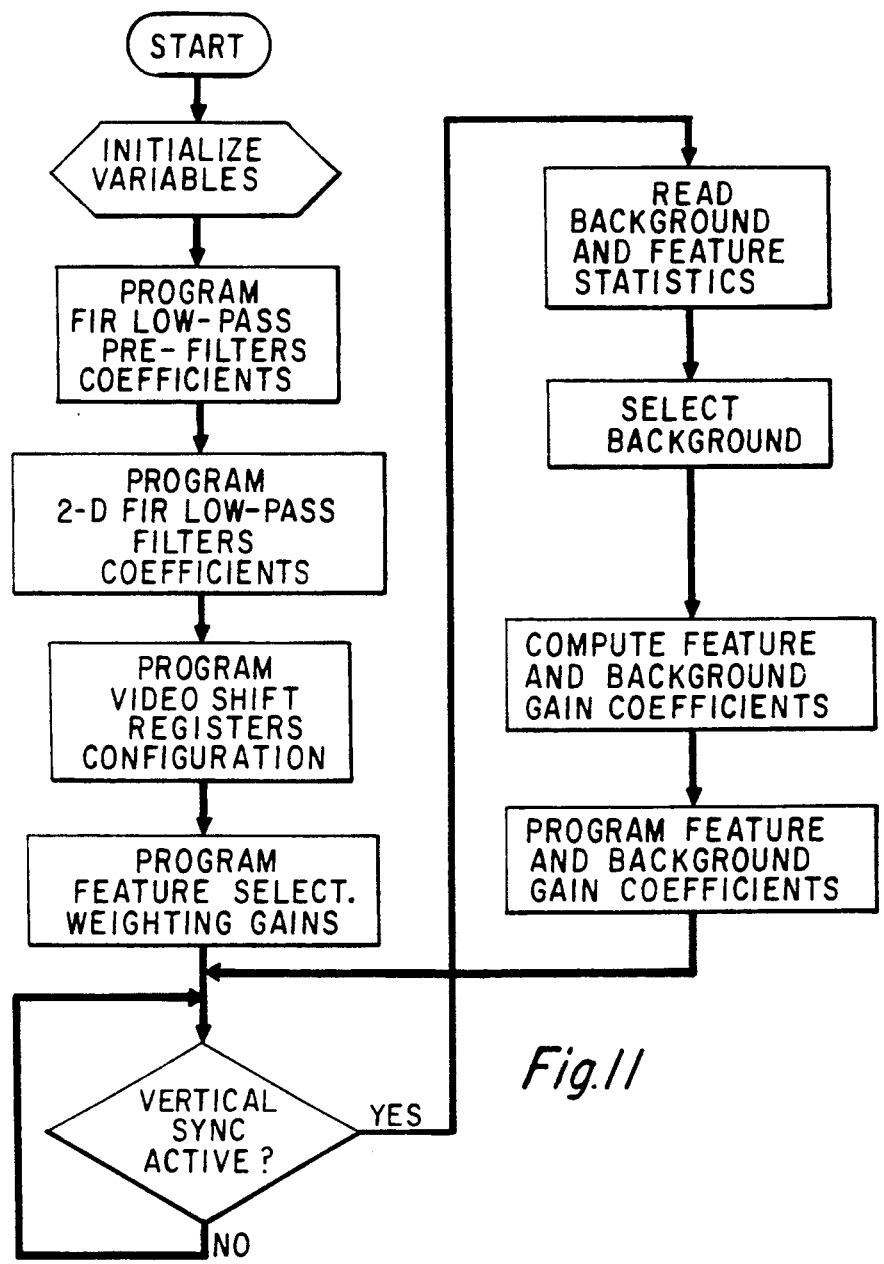
FIG. 11 is a high level flow chart of an image fusion controlling program in accordance with the present invention.

The processor, of which only the bus is discussed herein, can be any standard processor capable of performing the functions ascribed thereto herein. An 8086 processor can be used, for example. Attached hereto as FIG. 11 is a flow chart which sets forth the control of the processor for use in accordance with the present invention.

The above described method and system for fusing imagery from multiple sources employs various novel concepts as applied to image fusion. The overall concept of feature/background separation, feature selection, background selection and feature/background merge is novel. The approach in which the proportion of composite feature and background video is controlled in the resultant fused output is also novel.

While the above described system and method were specifically developed to fuse imagery from an image intensified or visible TV camera and a forward looking infra red (FLIR) system, it can also be applied to many other situations. The video sources can be different from the two listed herein. More than two sensor output can also be fused. The invention can be applied to a variety of video formats including interlaced, non-interlaced and horizontal and vertical raster formats.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

I claim:

1. A system for real time merging of video imagery information from multiple different sources, comprising:
    (a) a first sensor focused upon a sensor field for producing first signals indicative of a predetermined portion of a sensor field;
    (b) a second sensor having different characteristics from said first sensor and focused upon said sensor field for producing second signals indicative of said predetermined portion of said sensor field;

(c) means for separating said first signals into first feature signals and first background signals and for separating said second signals into second feature signals and second background signals;

(d) means responsive to said first and second feature signals for selecting the one of said first and second feature signals better meeting a predetermined condition;

(e) means responsive to said first and second background signals for providing a composite background signal; and (f) means for merging said composite background signal and said selected feature signal to provide a merged signal.

2. The system of claim 1 further including function means to perform a function responsive to said merged signal.

3. The system of claim 1 wherein said first and second signals are digital signals.

4. The system of claim 3 wherein said first and second sensors are simultaneously focused upon said sensor field.

5. The system of claim 4 wherein said means for merging includes means for weighting the ratio of said composite background signal to said selected feature signal.

6. The system of claim 5 wherein said first sensor and said second sensor are responsive to different spectral bands.

7. The system of claim 4 wherein said first sensor and said second sensor are responsive to different spectral bands.

8. The system of claim 3 wherein said means for merging includes means for weighting the ratio of said composite background signal to said selected feature signal.

9. The system of claim 8 wherein said first sensor and said second sensor are responsive to different spectral bands.

10. The system of claim 3 wherein said first sensor and said second sensor are responsive to different spectral bands.

11. The system of claim 1 wherein said first and second sensors are simultaneously focused upon said sensor field.

12. The system of claim 11 wherein said means for merging includes means for weighting the ratio of said composite background signal to said selected feature signal.

13. The system of claim 12 wherein said first sensor and said second sensor are responsive to different spectral bands.

14. The system of claim 11 wherein said first sensor and said second sensor are responsive to different spectral bands.

15. The system of claim 1 wherein said means for merging includes means for weighting the ratio of said composite background signal to said simulated feature signal.

16. The system of claim 15 wherein said first sensor and said second sensor are responsive to different spectral bands.

17. The system of claim 1 wherein said first sensor and said second sensor are responsive to different spectral bands.

18. A method for real time merging of video imagery information from multiple different sources, comprising the steps of:

(a) focusing a first sensor upon a sensor field to produce first signals indicative of a predetermined portion of a sensor field;

(b) focusing a second sensor having different characteristics from said first sensor upon said sensor field to produce second signals indicative of said predetermined portion of said sensor field;

(c) separating said first signals into first feature signals and first background signals and for separating said second signals into second feature signals and second background signals;

(d) selecting the one of said first and second feature signals better meeting a predetermined condition responsive to said first and second feature signals;

(e) providing a composite feature signal responsive to said first and second background signals; and (f) merging said composite background signal and said selected feature signal to provide a merged signal.

19. The method of claim 18 further including the step of performing a function responsive to said merged signal.

20. The method of claim 18 wherein said first and second signals are digital signals.

21. The method of claim 20 wherein said first and second sensors are simultaneously focused upon said sensor field.

22. The method of claim 21 wherein said step of merging includes means for weighting the ratio of said composite background signal to said selected feature signal.

23. The method of claim 22 wherein said first sensor and said second sensor are responsive to different spectral bands.

24. The method of claim 21 wherein said first sensor and said second sensor are responsive to different spectral bands.

25. The method of claim 20 wherein said first sensor and said second sensor are responsive to different spectral bands 26. The method of claim 18 wherein said first and second sensor are simultaneously focused upon said sensor field.

27. The method of claim 26 wherein said first sensor and said second sensor are responsive to different spectral bands.

28. The method of claim 18 wherein said step of merging includes weighting the ratio of said composite background signal to said selected feature signal.

29. The method of claim 28 wherein said first sensor and said second sensor are responsive to different spectral bands.

30. The method of claim 18 wherein said first sensor and said second sensor are responsive to different spectral bands.

* * * * *